United States Patent [19]
Barratt

[11] Patent Number: 5,347,642
[45] Date of Patent: Sep. 13, 1994

[54] CACHE MEMORY MANAGEMENT UNIT

[75] Inventor: Peter G. Barratt, Wellesley, Mass.

[73] Assignee: NEC Electronics Inc., Mountain View, Calif.

[21] Appl. No.: 443,996

[22] Filed: Nov. 30, 1989

[51] Int. Cl.⁵ .............................................. G06F 12/00
[52] U.S. Cl. ................................................... 395/425
[58] Field of Search ... 364/200 MS File, 900 MS File; 395/425, 400

[56] References Cited

U.S. PATENT DOCUMENTS

| | | | |
|---|---|---|---|
| 4,783,735 | 11/1988 | Miu et al. | 395/425 |
| 4,794,524 | 12/1988 | Carberry et al. | 395/425 |
| 4,835,686 | 5/1989 | Faruya et al. | 395/425 |
| 4,914,577 | 4/1990 | Stewart et al. | 395/400 |
| 4,972,316 | 11/1990 | Dixon et al. | 395/425 |
| 5,109,496 | 4/1992 | Beausoleil et al. | 395/400 |
| 5,125,085 | 6/1992 | Phillips | 395/400 |

Primary Examiner—Joseph L. Dixon
Assistant Examiner—Jack A. Lane
Attorney, Agent, or Firm—Skjerven, Morrill, MacPherson, Franklin & Friel

[57] ABSTRACT

A cache memory management unit that performs searches in a cache memory unit that supplements a disc memory that serves a digital computer. When the computer needs to write a chosen data block into, or read a chosen data block from, its disc memory, the unit first performs a search for the tag or identification label for the chosen data block in the cache memory unit, before the computer searches the disc memory. The unit also implements an algorithm that identifies the least recently used and most recently used cache data blocks.

4 Claims, 3 Drawing Sheets

CACHE MEMORY MANAGEMENT UNIT

FIELD OF THE INVENTION

This invention relates to a memory management unit for a cache memory that supplements disc memory in a digital computer.

BACKGROUND OF THE INVENTION

A cache memory is a supplemental, smaller memory unit that is positioned in the memory hierarchy between the CPU and a slower memory in a digital computer. One goal of use of a cache memory is to improve effective memory transfer rates and thus raise processor speeds for the computer itself. A cache memory is usually hidden and appears to be transparent to the computer user, who is only aware of the apparently higher speed of response of the computer main memory. The cache memory may be implemented by semiconductor devices whose speeds are comparable with that of the CPU itself, although the main memory utilizes less costly, lower speed semiconductor devices. Ideally, the cache memory contains only data that are most likely to be reused (many times) by the CPU in its operations. Because most data in the disc memory of a computer are not used many times before being modified or replaced by other data, the size of the cache memory may be made much smaller than the size of the memory.

The use of higher speed semiconductor devices in the cache memory, plus the smaller size of the cache memory relative to the disc memory, insure that searches for particular, multiply-used data will be completed much faster in cache memory then in the disc memory. The data in the cache memory may be updated each time the corresponding data in disc memory are updated so that little or no time is lost in the overwriting process. Some of the initial cache memories were of limited size (32K bytes available in the IBM 360/195 and 2K bytes in the DEC 11/70 system), but no intrinsic limits exist for the size of cache memory.

Introduction of cache memory techniques in disk drive controllers has resulted in a substantial improvement in controller system performance figures; controller speed has increased by a factor of 2-4, depending upon the bench mark test used. Even a gain in speed by a factor of 2 represents an attractive gain in the performance-cost ratio at the system level. However, use of cache techniques has led to a inclusion of greater amounts of computational power in the controller itself. Cache management requires extensive processing within the system and has sometimes led to the use of two processors to achieve the necessary real time performance. Even where dual processors are used, detection of a cache "hit" (finding a chosen data word in cache memory before beginning the lengthier search in disc memory) and subsequent transfer of the chosen data word to the host computer requires about 3 msec for 2048 bytes of data. Use of firmware techniques in a fully associative cache memory may require time intervals up to 1 msec for detection of a hit using 512 cache buffers that each contain a data word. The invention disclosed herein can determine if a chosen data word is contained in cache memory and identify the data word pointer to the appropriate memory space in about 1.9 μsec when the system is clocked at a minimum cycle time of 50 nsec.

SUMMARY OF THE INVENTION

The cache memory management unit disclosed herein is designed to offload to the unit many of the cache management tasks that the processor normally performs for itself, such as storage of cache tags (identification labels for the data blocks stored in cache memory), detection of cache memory hits, identification of a desired data buffer and allocation of buffers by an appropriate algorithm. The cache memory management unit also provides a convenient means for locking data contained in certain buffers into cache, using mask bits that are associated with the cache memory management unit, and for allocating buffers between a plurality of peripheral computer devices. The unit can, in one embodiment, provide storage for 4096 words, each with a tag of up to 32 bits each, in a single 32-pin package.

Mapping is fully associative, which is the optimum approach. The invention disclosed here allows up to a 33% improvement in disk system performance for the disclosed cache memory management unit over conventional methods. The response time of the cache memory management unit is substantially independent of the number of buffers or cache memory data blocks used.

Set up for the cache memory search begins by loading a 32-bit search word or data tag (identifying the chosen data block in memory) and a 32-bit mask word into the system; the search word and the mask word are each decomposed into two 16-bit sub-words so that the two words, data tag and mask, may be loaded in parallel using a single 32-pin package When a data block is requested by the host computer, the cache memory tags are first searched to determine if the data word resides in the cache memory. In one embodiment, the cache memory management unit provides for storage of up to 4096 data tags of up to 32 bits each, plus another 12 tag pointer bits to identify the location in cache memory for each 32-bit data tag. Upon command, the unit interrogates all tags in the cache memory module in seeking a specified tag. Upon completion of this task, the unit reports the result of the search as a "hit" (one data tag in the cache memory module matches the data tag of the chosen data word or block), as a multiple hit (two or more matching data tags found among the cache memory module data tags), or as a miss (no hits). When the cache search results in a hit, a cache pointer, having 12 pointer bits in one embodiment and associated with the tag, is made available to the controller CPU to point to the appropriate data buffer in cache memory that contains the chosen data block. When a search results in multiple hits, the address of the most recently used buffer is provided; this approach permits detection of and recovery from error conditions, where a sector might be cached in more than one buffer. This approach also allows certain types of masked search operations to be used. The tag search operation takes a maximum of 38 clock cycles after the search is initiated and results in a completion time of 1.9 μsec for a 50 nsec clock cycle time. A cache pointer indicating the appropriate buffer is available in an additional 12 clock cycles or 600 nsec.

Bits that are preset in a mask register will force a match for the corresponding bit positions of the data tags being searched. This type of masked cache memory search is useful, for example, when the system looks for data within a range of a specified number of tracks, where low order sector address bits are ignored.

Writing to the memory system is accomplished by writing first to the cache memory and from cache memory to the disc memory. This frees the disk controller to service another data request from the host computer without waiting for the peripheral device to actually perform the write operation to the disc memory.

The objects of this invention may be attained by apparatus that includes in one embodiment a comparator register that receives and stores an N-bit data tag, which has an associated M-bit tag pointer, for a chosen data block, where M and N are positive integers, for subsequent comparison with tags for cache data blocks contained in a cache memory module. The invention further includes a tag register containing up to $2^M$ tag positions, numbered $k=0, 1, 2, \ldots, 2^M-1$, each of length approximately N bits. An N-bit tag identifies each data block in a disc memory, for receipt and storage of the tag for each cache data block stored in a cache memory module. Upon receipt by the comparator from a host digital computer of the data tag for a chosen data block, each tag in the tag register is compared with the data tag in the comparator. If one or more tags are identical with the given data tag and resequencing is chosen, the tag and associated tag pointer with the lowest-numbered tag position (k) that is identical to the data tag is moved to the $k=0$ position. All other tag positions between number $k=0$ and this lowest-numbered tag position are resequenced by use of a Most Recently Used algorithm, and the cache data block that is identified by this tag with the lowest-numbered tag position is provided for the digital computer. If no tag in the tag register is identical to the data tag for the chosen data word, the host digital computer is notified of this event so that the disc memory can be searched for the chosen data block.

DETAILED DESCRIPTION

Figure 1:
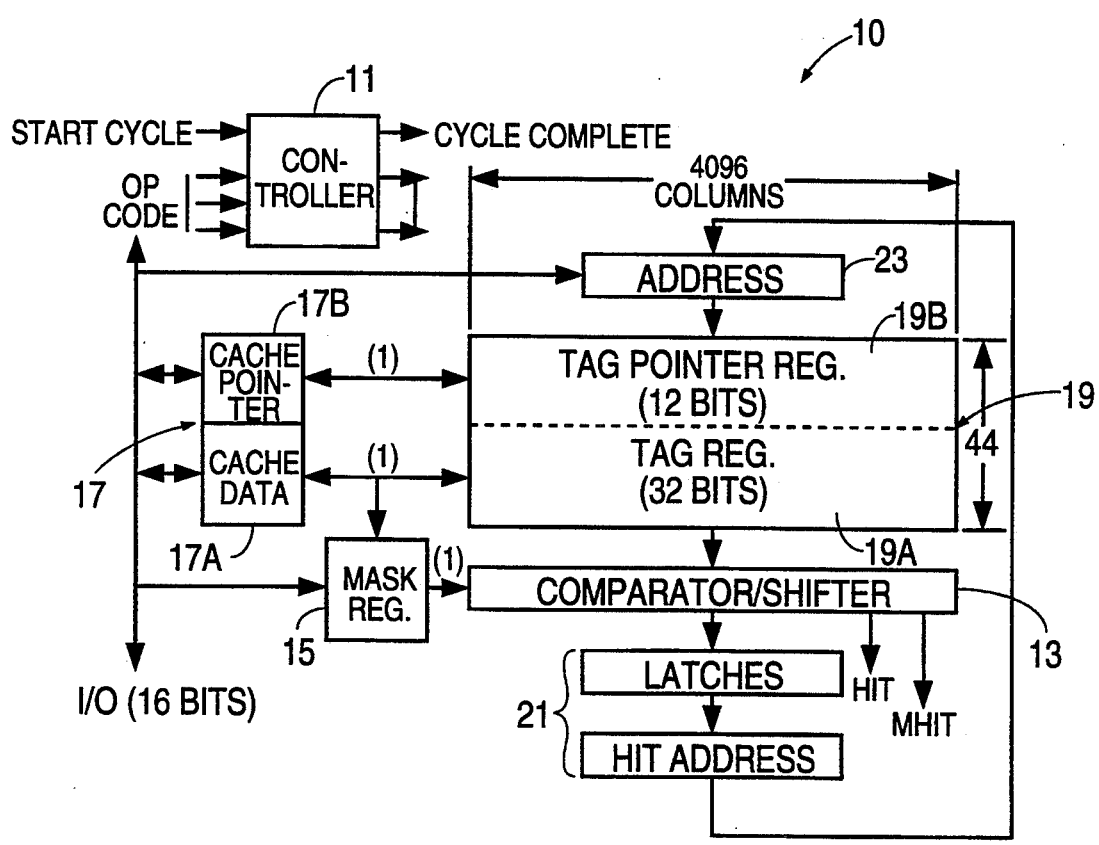
FIG. 1 is a plan view of one embodiment of the invention, showing the relationship of tag and tag pointer portions of the data word register to other components.

FIG. 1 illustrates one embodiment of the invention for the cache memory management unit ("CMMU" or "Unit") 10. A controller 11 issues a command for a particular data block, as specified by a particular data tag word, which is a sequence of binary digits or bits (up to 32 bits in length) that describes where in the disc memory (not shown) the chosen data block may be found. Before the disc memory is searched for the data block, a cache tag unit 19 is first searched to determine whether the chosen data block is available from the cache data memory unit 17. The 32-bit data tag identifying the data block in disc memory is provided by the controller 11 to a comparator/shift register 13 that temporarily stores the chosen data tag for comparison with each of the tags corresponding to data blocks contained in the cache memory. A mask register 15, which contains a 32-bit mask sequence, is used to load the mask sequence into the comparator 13 together with the 32-bit data tag of the chosen data block. The mask sequence is brought into registration with a 32-bit cache tag from the cache tag unit 19 in the comparator 13 and the cache tag is compared with the data tag of the chosen data block. Some of the mask sequence bits may be "ones", indicating that, in a comparison of a cache tag with the data tag of the chosen data block, these bits are preemptorily chosen to be each equal to logical one so that a (forced) match is present at such bit position(s). The remaining bits of the mask sequence may be open, indicating that each of such bits has not been preemptorily chosen. In effect, the unmasked bits of a 32-bit cache tag will be compared with the corresponding bits from the chosen data tag to determine whether the cache data memory contains the chosen data block.

The CMMU 10 also contains a cache pointer register 17b that contains one 12-bit cache pointer, associated with each cache data block in the cache data memory (not shown); each cache data block in the cache data memory has a unique cache pointer associated therewith and contained in the cache pointer portion 17b of the cache register 17.

Figure 2:
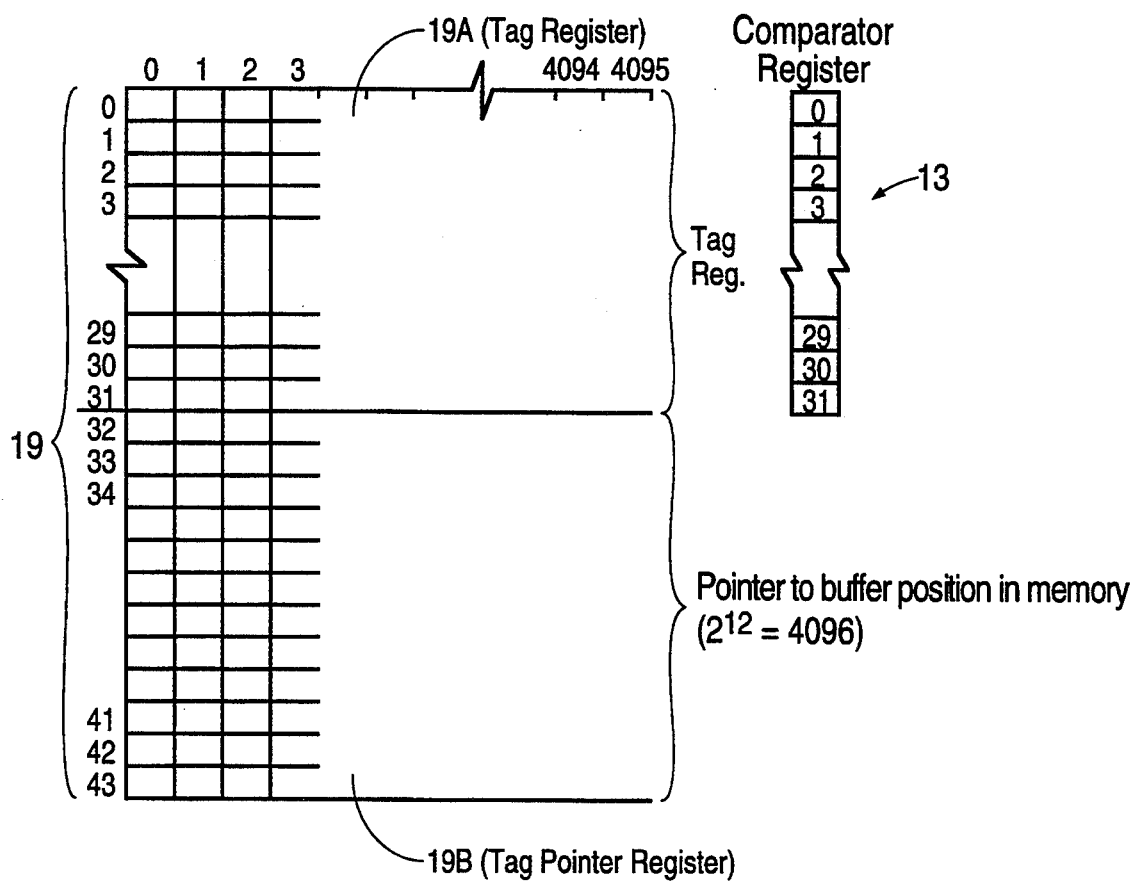
FIG. 2 is a more detailed schematic view illustrating the use of the different bit positions in the tag register and tag pointer register used in FIG. 1.

The cache register unit 17 is associated with the cache tag memory 19, which comprises a tag memory 19a and an associated tag pointer register 19b. With reference to FIG. 2, the tag memory 19a in this embodiment comprises a matrix having 32 rows (numbered 0, 1, 2 . . . , 31) of bits and $2^{12}=4096$ columns (numbered 0, 1, 2, . . . 4095), of bits, with each column of the tag memory 19a containing a 32-bit tag, preferably unique, that corresponds to and identifies one of the cache data blocks contained in the cache data memory. The tag pointer memory 19b, as illustrated in FIG. 2, is a matrix having 12 rows (numbered 32, 33, 34 . . . , 43) of bits and having $2^{12}=4096$ columns (numbered 0, 1, 2, . . . , 4095) of bits. Each 12-bit tag pointer in the tag pointer memory 19b contains one, and only one, of the 12-bit cache pointers in the cache pointer memory 17b, and is identified with the 32-bit tag that lies in the same column as the tag pointer in the tag memory 19a as shown in FIG. 2. Thus, each 32-bit tag in the tag memory 19a is directly and uniquely associated with a 12-bit tag pointer in the tag pointer memory 19b.

Each of the 4096 tags contained in the tag memory 19a is sequentially compared with the data tag, as masked by the mask provided by the mask register 15, for the chosen data tag in the comparator 13. All bits of the cache tag from the tag memory 19a, except the bits that are masked, must match the bits of the data tag for the chosen data block, in order for a "hit" to occur. If a "hit" occurs, the chosen data pointer is available in the cache register 17 so that the disk controller need not initiate a lengthier search for the chosen data block in disc memory (not shown). If no hit occurs, then the controller initiates a search for the chosen data block in disc memory. Each hit in the tag memory 19a has its corresponding tag memory address (column address) latched in a coincidence address latch 21, and the lowest-numbered column address of such a hit is delivered to a coincidence address module 23 that identifies the tag pointer in the tag pointer memory 19b corresponding to this hit. Preferably, no more than a single hit occurs for a given search of the tag memory 19a. However, multiple hits may occur, especially when the tag from the tag memory 19a is masked by a mask sequence provided by the mask register 15. If multiple hits occur, the tag with the lowest column number is used for purposes of providing the cache data pointer from the tag pointer memory 19b. Alternatively, the tag with the highest column number may be used for providing the cache data tag memory 19a, mutatis mutandis.

The choice of $2^{12}=4096$ columns for the tag memory 19a and for the tag pointer memory 19b is not essential; nor is the choice of 32 rows for the matrix of the tag memory 19a or the choice of 12 rows for the pointer memory 19b essential. If the cache data memory (not shown) is allowed to have $2^M$ data words as entries and the number of tag bits necessary to identify a data block in disc memory (not shown) is N, then the number of columns in each of the tag memory 19a and the tag pointer memory 19b should be $2^M$, the number of rows in the tag pointer memory 19b should be M, and the number of rows in the tag memory 19a should be N. For the particular choice illustrated above, M=12, N=32, the number of data blocks in cache memory is $2^{12}=4096$ or less, and the number of distinct data blocks in disc memory is $2^{32}=4,294,967,396$ or less.

Figure 3:
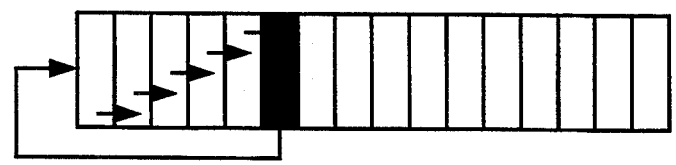
FIG. 3 is a schematic view of the resequencing of columns that occurs in the cache tag unit when such columns are rearranged according to the MRU algorithm.

Conceptually, the CMMU 10 can be thought of as a push down stack where each location in the cache tag unit 19 (i.e., a column of $32+12=44$ bits in the preferred embodiment) stores a tag and a tag pointer that describes where the cache data word, or a buffer containing the cache data block, is located in the cache memory unit 17. When a search for a chosen data block is initiated, the tag stack is first searched for the tag of the chosen data block. If the tag is found in the tag stack, a hit has occurred. The tag and tag pointer may then be moved to the top of the stack (column 0 in FIG. 2) by a resequencing operation, and all column entries that were above this combined tag and tag pointer are now moved down by one, as indicated in FIG. 3. This effectively resequences the tag/tag pointer columns in order of most recent use. If buffers are used and must be allocated for writing a data block to cache memory, the least recently used buffer, which is the bottom entry or highest numbered column, is pulled from the tag stack and may be placed on the top with a new tag and associated tag pointer by the resequencing operation.

If the CMMU 10 is to be allocated between several controlling devices (e.g., several disc controllers), some of the tag bits can be assigned to indicate the controlling device associated with that buffer. Searching of the tag stack may then proceed from either direction (i.e., from lowest column number to highest column number or inversely) and can be specific to a controlling device. Buffers may also be dynamically allocated by changing the appropriate tag bits.

In a tag search, each of the 32-bit sequences from the tag memory 19a (4096 sequences in all) is compared with the 32-bit sequence for the chosen data word that is contained in the cache data register 17a. The 32-bit mask sequence provided by the mask register 15 is used as an overlay on the result of comparing each of the 32 tag bits from the tag memory 19a with the corresponding bits for the desired data word. A logical one contained at a particular bit position in the mask sequence will force a "true" comparison for that corresponding position of the tag word for all of the 4096 columns that are compared. A priority encoder that is part of the coincidence address latch 21 encodes the column address of the lowest address hit, if any. The address of the hit, if any, is fed to a coincidence address module 23 that serially reads the 12-bit tag pointer of this hit column in the tag pointer memory 19b and loads the pointer into cache pointer register 17b. The cache pointer word in the cache pointer register 17b then identifies the data buffer address in an address look-up memory (not shown) that contains the address of the data block buffer in cache memory.

If no hit is found by the comparator 13, no "hit" or "multiple hit" signal is passed through the coincidence latch module 21.

If buffer allocation is desired, for example, in a command to write a data block to a chosen location in disc memory, a Least Recently Used ("LRU") algorithm is used for the cache tag unit 19, relevant tag bit and mask bit data are stored in the tag register 17a, and the mask register 15. Operation is similar to that for a tag search in response to a command to read from memory, except that priority encoding of the hit column proceeds backward from the highest column address to the lowest column address. The buffer pointer that is allocated corresponds to the highest column address of a successful match and represents the least recently used buffer or position in the cache data memory. The mask register 15 may be used to insure that only buffers with the right attributes, controlling device assignments, etc., will be considered here.

A resequence algorithm is used to shift the column that contains the most recent hit to the lowest column (column number 0) in the cache tag memory 19. If a hit occurs in column number P, the tag and tag pointer corresponding to this hit are moved to column 0, and the former contents of each of the columns 0, 1, 2 .... P−1 are each shifted to the right by one column in FIG. 2, as illustrated in FIG. 3. The most recently used tag and tag pointer are then contained in column 0. In this manner, the least recently used (or unused) tags and tag pointers will ultimately be pushed to the bottom of the stack, corresponding to the highest column (number 4095 in this embodiment).

When a new data block is to be written to a particular data block location in disc memory, cache memory is first interrogated to determine if that data word is also contained in cache memory. If a hit occurs here, the new data block is first written to the cache memory and then to disc memory. After the new data block is written to the cache data memory, the system may continue without waiting for completion of the actual write operation to disc memory. If a subsequent request to read this data block is received before the data block is written to disc memory, the data block will be in the cache data memory and will be quickly available.

Writing a data block corresponding to a particular tag location in the tag memory 19a is done with a single location write. The contents of the cache tag register 17a and cache pointer register 17b will be loaded into the appropriate bit positions of the column specified; and the corresponding contents of the tag memory 19a and tag pointer memory 19b will be similarly loaded, for the column specified.

When the system is first powered up, the controller CPU clears the cache tag memory 19. Using single location write commands, each pointer in the tag memory 19a and corresponding tags in the tag pointer memory 19b are loaded according to a predetermined choice of cache pointers. This choice may include attribute bits that are used to assign buffers among various controlling devices so that the cache data memory is allocated for use among these devices. If the operator wishes to utilize fewer than the 4096 data words provided in cache memory, the extra locations in the cache tag memory 19a are simply left unassigned.

Figure 4:
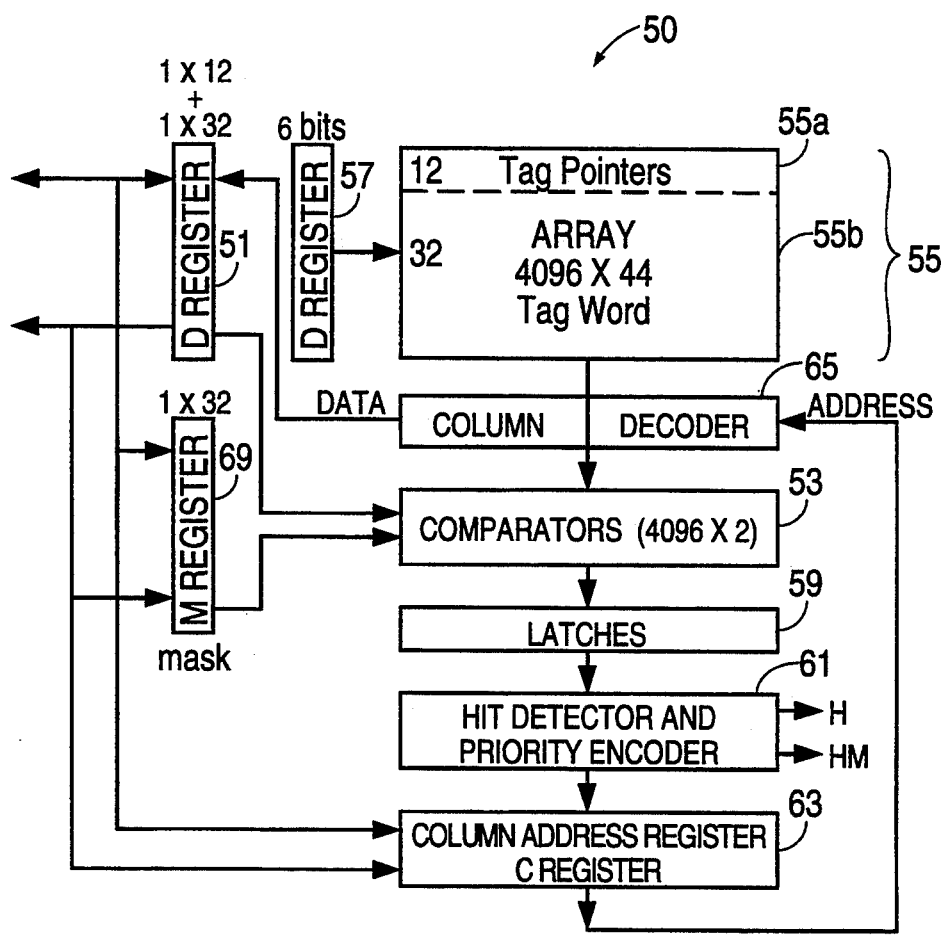
FIG. 4 is a block diagram of a circuit 50 which can be used to implement the embodiment shown in FIG. 1.

FIG. 4 is a block diagram of circuit 50, which is an implementation of the embodiment shown in FIG. 1. As shown in FIG. 4, tag pointer and tag registers 19 can be implemented by a 4096×44 memory array 55, which can be addressed in consecutive row order by a 6-bit counter register 57. In memory array 55, each 44-bit column can store a 32-bit tag and a 12-bit pointer indicating the location of the cached data in cache 17 which corresponds to the 32-bit tag. In this arrangement, each of the 4096 columns of memory array 55 can be simultaneously compared in the 4096 bit-comparators 53 with the corresponding 32 bits of a requested tag contained in register 51. As discussed above, mask register 15 of FIG. 1 holes a pattern which specifies a forced match at each of the bits set in the pattern. Mask register 15 is implemented in circuit 50 by register 69. Thus a match between a column stored in memory array 55 is completed in 32 clock periods. Latches 59 and hit detector and priority encoder circuit 61 (i) determine whether no hit, a single hit or a multiple hit is detected, and (ii) provide a column address in column register 63 to specify which of the 4096 columns contains the desired tag under the selection policy discussed above, e.g. the highest column address. Column address decoder 65 selects the column specified in column register 63 for output to register 51. The tag pointer corresponding to the desired tag is then shifted bit by bit in the next 12 clock periods into register 51 to be used to access the corresponding data stored in cache 17.

I claim:

1. In a digital computer, a cache memory management apparatus for a cache memory holding copies of selected data blocks of a disc memory, said apparatus comprising:

a cache tag register containing $K_f$ tag positions, number $k=0, 1, 2, \ldots, K_f-1$, where $K_f$ is a positive integer, each tag position containing an N-bit disk data location tag, corresponding to the location in disk memory of a selected data block, and an M-bit tag pointer, corresponding to the location in cache memory at which a copy of said selected data block is held;

a comparator circuit, receiving from said digital computer an input disk data location tag, for comparing said input disk data location tag to said disk data location tags at said $K_f$ positions of said cache tag register, said comparator circuit including a priority encoder which provides, as an output tag pointer, the tag pointer at the $k=p$ tag position, the $k=p$ tag position being (a) during a read operation, the lowest-numbered tag position that has a disk data location tag matching said disk data location tag from said digital computer, and (b) during a write operation, the highest numbered tag position that has a disk data location tag matching said input disk data location tag; and means for moving (a) by one tag position the contents at each of the tag positions in said cache tag register between the $k=0$ and the $k=p-1$ positions to the respective tag positions between the $k=1$ and the $k=p$ tag positions, and (b) said input disk data location tag and said first output tag pointer to the $k=0$ tag position.

2. Apparatus according to claim 1, further including a mask register connected to said comparator, to provide an N-bit mask sequence that is received by said comparator together with said input disk data location tag, each bit of the N-bit mask sequence corresponding to a bit in each of the input disk data location tag and said disk data location tags in said cache tag register, such that said comparator compares only the corresponding bits in each disk data location tag of said cache tag register to the corresponding bits of the input disk data location tag not set in the bits of said mask sequence.

3. In a digital computer, a method for managing a cache memory holding copies of selected data blocks of a disc memory, said method comprising the steps of:

providing a cache tag register containing $K_f$ tag positions, numbered $k=0, 1, 2, \ldots, K_f-1$, where $K_f$ is a positive integer, each tag position containing an N-bit disk data location tag, corresponding to the location in disc memory of a selected data block, and an M-bit tag pointer, corresponding to the location in cache memory at which a copy of said selected data block is held;

receiving from said digital computer an input disk data location tag;

comparing, in a comparator circuit, said input disk data location tag to said disk data location tags at said $K_f$ positions of said cache tag register, said comparator circuit including a priority encoder which provides, as an output tag pointer, the tag pointer at the $k=p$ tag position, the $k=p$ tag position being (a) during a read operation, the lowest-numbered tag position that has a disk data location tag matching said disk data location tag from said digital computer, and (b) during a write operation, the highest numbered tag position that has a disk data location tag matching said input disk data location tag; and moving (a) by one tag position the contents at each of the tag positions in said cache tag register between the $k=0$ and the $k=p-1$ tag positions to the respective tag positions between the $k=1$ and the $k=p$ tag positions, and (b) said input disk data location tag and said first output tag pointer to the $k=0$ tag position.

4. The method of claim 3, further including the step of using a mask register connected to said comparator, to provide an N-bit mask sequence that is received by said comparator together with said input disk data location tag, each bit of the N-bit mask sequence corresponding to a bit in each of the input disk data location tag and said disk data location tags in said cache tag register, such that said comparator compares only the corresponding bits in each disk data location tag of said cache tag register to the corresponding bits of the input disk data location tag not set in the bits of said mask sequence.

* * * * *